(12) United States Patent
Boussemart et al.

(10) Patent No.: US 9,060,648 B2
(45) Date of Patent: Jun. 23, 2015

(54) ENERGY SAVING MANAGER FOR BEVERAGE PREPARATION DEVICES

(75) Inventors: Christophe S. Boussemart, Lugrin (FR); Fabien Ludovic Agon, Le Bouveret (CH)

(73) Assignee: Nestec S.A., Vevey (CH)

( * ) Notice: Subject to any disclaimer, the term of this patent is extended or adjusted under 35 U.S.C. 154(b) by 515 days.

(21) Appl. No.: 12/811,330

(22) PCT Filed: Jan. 22, 2009

(86) PCT No.: PCT/EP2009/050682
§ 371 (c)(1),
(2), (4) Date: Jun. 30, 2010

(87) PCT Pub. No.: WO2009/092745
PCT Pub. Date: Jul. 30, 2009

(65) Prior Publication Data
US 2010/0282087 A1    Nov. 11, 2010

(30) Foreign Application Priority Data
Jan. 24, 2008    (EP) .................................... 08100853

(51) Int. Cl.
*A47J 31/44* (2006.01)
*A47J 31/52* (2006.01)

(52) U.S. Cl.
CPC ..................................... *A47J 31/52* (2013.01)

(58) Field of Classification Search
CPC ..................................................... A47J 31/52
USPC .................................... 99/281, 288, 300, 280
See application file for complete search history.

(56) References Cited

U.S. PATENT DOCUMENTS

| 1,731,226 A | 10/1929 | Stare ............................. 223/361 |
| 2,150,801 A | 3/1939 | Keaton ............................. 219/43 |
| 2,507,666 A | 5/1950 | Goldthwaite .................... 219/37 |
| 3,969,610 A | 7/1976 | Ratti et al. ..................... 219/441 |
| 5,440,972 A * | 8/1995 | English ........................... 99/282 |
| 6,459,854 B1 | 10/2002 | Yoakim et al. ................ 392/479 |
| 6,661,968 B2 | 12/2003 | Beaulieu ....................... 392/471 |
| 6,739,241 B2 | 5/2004 | Long et al. ..................... 99/288 |
| 6,752,069 B1 | 6/2004 | Burke et al. .................... 99/280 |
| 6,964,222 B1 * | 11/2005 | Tucker ............................ 99/281 |
| 7,197,367 B2 | 3/2007 | Brinkemper et al. ........... 700/90 |

(Continued)

FOREIGN PATENT DOCUMENTS

| DE | 299 17 036 | 2/2000 |
| DE | 198 45 464 | 4/2000 |

(Continued)

OTHER PUBLICATIONS

International Search Report and Written Opinion, PCT/EP2009/050684, mailed Jul. 23, 2009.

(Continued)

*Primary Examiner* — Jianying Atkisson
(74) *Attorney, Agent, or Firm* — K&L Gates LLP

(57) ABSTRACT

An electrically powered device for preparing beverages, in particular hot beverages, that includes means for conditioning a liquid to prepare one or more batches of beverage after such a beverage preparation device has been switched on; and a power management arrangement for shutting down the beverage preparation device automatically.

27 Claims, 1 Drawing Sheet

(56) References Cited

U.S. PATENT DOCUMENTS

| | | | |
|---|---|---|---|
| 8,171,843 B1* | 5/2012 | Heffington | 99/282 |
| 2003/0037681 A1 | 2/2003 | Zhu et al. | 99/325 |
| 2005/0188856 A1* | 9/2005 | Sumser et al. | 99/279 |
| 2007/0199452 A1 | 8/2007 | Dworzak et al. | 99/275 |
| 2008/0282897 A1* | 11/2008 | Webster et al. | 99/280 |

FOREIGN PATENT DOCUMENTS

| | | |
|---|---|---|
| DE | 199 24 279 | 11/2000 |
| EP | 0 512 468 | 11/1992 |
| EP | 0 512 470 | 11/1992 |
| EP | 0 602 203 | 6/1994 |
| FR | 2 326 898 | 5/1977 |
| FR | 2 367 465 | 5/1978 |
| GB | 706 866 | 4/1954 |
| JP | 60205131 | 10/1985 |
| WO | WO 95/34236 | 12/1995 |
| WO | WO 2004/006742 | 1/2004 |
| WO | WO 2004/098360 | 11/2004 |
| WO | WO 2006/029763 | 3/2006 |
| WO | WO 2006/102980 | 10/2006 |
| WO | WO 2007/027379 | 3/2007 |

OTHER PUBLICATIONS

International Search Report and Written Opinion, PCT/EP2009/050682, mailed Apr. 17, 2009.

* cited by examiner

ENERGY SAVING MANAGER FOR BEVERAGE PREPARATION DEVICES

This application is a 371 filing of International Patent Application PCT/EP2009/050682 filed Jan. 22, 2009.

FIELD OF THE INVENTION

The invention relates to the field of devices for preparing beverages, particularly devices which are designed to produce a beverage using a pre-portioned beverage or liquid comestible (soup etc.) ingredient such as capsules or pods containing ground roasted coffee or tee, which device have a user-programmable power management arrangement.

BACKGROUND ART

Electrically powered devices for preparing beverages, in particular hot beverages such as tee or coffee or soups, including such beverages that are prepared using portioned ingredients for instance contained in capsules or pods, have been developed and have become very popular, for use at home as well as out of home.

However, such devices, especially those having electric heaters for heating up the liquid of the beverage, consume a significant amount of electric energy when they are switched on even when they are not in the process of preparing beverages, typically after a beverage has been prepared and the machine is left switched on by the user for no particular purpose or just to avoid a lengthy start-up period between consecutive beverage preparations, in particular a start-up involving pre-heating and/or self-cleaning of the machine.

This, however, goes against a generally sought aim, especially in more recent times, towards energy saving. Considering the wide use of beverage preparation devices, it is all the more desirable to provide such devices that waste less energy and are thus more environmentally friendly.

It has been proposed to reduce to some degree unnecessary waste of energy resulting from electric beverage preparation devices that are left switched on without being used to prepare beverages, by incorporating automatic turn-off systems into such devices, in particular timers.

WO 95/34236 discloses a coffee maker which is arranged to measure and heat a predetermined volume of water corresponding to a desired portion of brewed beverage. The coffee maker is arranged to fill a beverage receptacle that has a capacity of typically one to eight cups, a cup representing 5.5 to 6 ounces. The coffee maker is arranged to estimate the dispensed volume of coffee by counting the pump movements and once the appropriate volume of coffee is believed to have been delivered into this beverage receptacle, the coffee preparation cycle is over and the coffee maker shuts down automatically. In other words, the coffee maker is arranged to shut down automatically after every filling of a beverage receptacle. WO 2004/098360 discloses another manner to measure the volume dispensed to the beverage receptacle by using a flow meter in view of improving the accuracy of the measured volume over time, the user being able to chose a number of beverage volume units to be dispensed into his beverage receptacle. Furthermore, this latter reference inter-alia also mentions the possibility to incorporate an auto shut-off switch.

There are various timer-based automatic shut-off systems that have been described in the art. In U.S. Pat. No. 6,752,069, an automatic timer system for beverage preparation devices is disclosed which shuts off a warmer automatically. Two shut-off programs are proposed: either the user presets a predetermined period of time during which the device is on and then the warmer is shut off automatically once this period of time has lapsed, or, alternatively, a timer routine is run after each beverage preparation, leading to the shut-off of the warmer when the timer manages to run out completely while no beverage has been prepared. U.S. Pat. No. 7,197,367, assigned to Miele, discloses inter-alia a beverage preparation device that can be programmed by the user so that the device switches on and off automatically. For instance, the CVA 2660 system of the assignee allows the user to program the machine so that it turns off automatically if for a period of time selected by the user in the range of 20 minutes to 2 hours, no beverage has been prepared. U.S. Pat. No. 3,969,610 discloses a coffee brewer that has an incorporated timer for presetting a switch on and switch off time. US 2003/0037681 discloses a similar principle in which a cooking machine is programmed from a remote location, e.g. via a computer network, to be switched on and off at a given time. DE 199 24 279 discloses an electromagnetic actuator for operating automatically a shut-off switch of such beverage preparation devices. The actuator is controlled for automatic shut-off of the machine on a time or temperature basis.

Despite the existence of the abovementioned energy saving systems, there is still a need to provide a device for preparing beverages with improved energy saving possibilities and greater flexibility in arranging the energy saving to fit the various users' needs and preferences.

SUMMARY OF THE INVENTION

Therefore, the invention generally relates to an electrically powered device for preparing beverages, such as beverages prepared on the basis of pre-portioned ingredient batches. The pre-proportioned ingredient batches may be supplied within packages, typically capsules, to the production machine or may be formed in the machine by supplying a predetermined amount of ingredient from an ingredient reservoir of the machine. Optionally, the ingredient supplied from the reservoir may be transformed before liquid is fed thereto. For example, the ingredient is ground coffee that is supplied to the production machine within packages or from a reservoir of the machine containing a stock of ground coffee. Alternatively, the ingredient is in the form of coffee beans stored in a reservoir that are supplied in batches and ground before the liquid is fed.

Typically, the beverage preparation device is configured to prepare hot and/or cold beverages, such as tee, coffee, frothed milk, ice drinks, etc., and has heating, cooling and/or other electric components that, when turned on, consume significant amounts of energy. Examples of beverage preparation devices having such components are disclosed in U.S. Pat. Nos. 6,459,854 and 6,661,968.

The beverage preparation device of the present invention comprises: means for conditioning a liquid, usually water, to prepare one or more batches, in particular cups, of beverage after such beverage preparation device has been switched on; a power management arrangement that includes a user-programmable automatic power shut down means for shutting down such beverage preparation device automatically by running an automatic shut down process after a beverage has been prepared. Usually, the automatic power shut down means can be deactivated (and also re-activated) by the user.

With the view of saving energy, it would be desirable to allow the user to program the beverage device so that at least part of the electric components of the device be turned off automatically when they are not intended to be used in a near future to prepare a beverage, at the end of the preparation of the last beverage or shortly thereafter (e.g. after a few seconds or possibly a couple minutes after a last beverage batch has been prepared), instead of merely waiting that a timer, started at switch on or at the end of each beverage preparation, has run out after tens of minutes or hours like in the abovementioned U.S. Pat. No. 6,752,069, U.S. Pat. No. 7,197,367, U.S. Pat. No. 3,969,610, US 2003/0037681 and DE 199 24 279.

Thus, in accordance with the invention, the automatic power shut down means is programmable by the user in at least one beverage preparation-related shut down mode to initiate the shut down process upon completion of the preparation of a last beverage batch if a user-preselected shut down condition has been fulfilled by the preparation of said last beverage batch. Usually, the user will have the possibility to select at least one shut down condition for programming the shut down means, which condition is not fulfilled by the preparation of every beverage.

When beverages are prepared from pre-proportioned ingredient batches such as ingredient capsules, a beverage batch, e.g. a cup, will usually be prepared from a single ingredient capsules or from a combination of different ingredient capsules when the beverage batch includes, normally in addition to water, a combination of different ingredients conditioned as different pre-portioned ingredient batches such as capsules. For example, a cappuccino or caffè latte can be prepared from a first pre-portioned milk ingredient batch and from a second pre-portioned coffee ingredient batch. Likewise, hot chocolate may be prepared from a pre-portioned milk ingredient batch and a pre-portioned chocolate or cocoa ingredient batch.

Such beverages are typically prepared on the basis of pre-portioned ingredient batches. The pre-proportioned ingredient batches may be supplied within packages, typically capsules, to the production machine or may be formed in the machine by supplying a predetermined amount of ingredient from an ingredient reservoir of the machine.

The automatic power shut down means can be programmable by the user in at least one beverage preparation-related shut down mode to initiate the shut down procedure after the following two conditions are fulfilled: one or more beverages have been prepared and/or dispensed; and a user-preselected shut down condition is fulfilled by the preparation of a last beverage preparation before initiation of the shut down procedure.

In other words, the present invention has an automatic shut-off system that manages in an optimal manner the random character of the timing of the last beverage to be prepared and dispensed or that may be prepared and dispensed. The moment at which the event triggering the shut-off process will occur, will not or hardly be predictable by the machine when the automatic shut-off arrangement is activated.

Conversely, WO 95/34236 and WO 2004/098360 provide an automatic shut-off of the preparation machine each time when a beverage, the volume of which may be preset by the user, has been served. In this case, the beverage preparation machine is instructed by the user to serve a user-selected quantity of beverage, the machine then prepares and delivers this quantity as a single batch into a user receptacle, such as a mug or a cup depending on the selected quantity, and when this preparation of a beverage batch is over, the machine shuts down automatically. The automatic shut-off system does not give the option to shut down the machine only after a predetermined plurality of distinct beverages have been dispensed at random periods of time, it shuts down automatically each time an individual beverage batch has been prepared.

U.S. Pat. No. 6,752,069, U.S. Pat. No. 7,197,367, U.S. Pat. No. 3,369,610, US 2003/0037681 and DE 199 24 279 have a timer-based automatic shut down mode that takes as a starting point either the switching on of the machine or the last beverage dispensed. Hence, it is after a predetermined period of time that the machine is switched off and not with the completion of a timely random event, such as the moment when the machine is finished serving a last individual beverage of a user-preset number of beverages that should be dispensed. Hence, the prior art timer-based shut down system does not efficiently adapt to the particular condition of use of the beverage machine to save energy once the shut-off system has been set by the user but involves a significant waste of energy until the timer has run out to the end.

For the present invention, the user is given the possibility to choose a condition that a beverage preparation process has to fulfil so that the shut down process is started. Such a condition may for example relate to the number of beverages the device is supposed to prepare before shut down or to another event related to the process of preparing a given beverage. Hence, at least one user-selectable condition that triggers the shut down of the beverage preparation device occurs during the preparation of a beverage and not thereafter, like for timer-based shut down options (i.e. the absence of preparation of beverages for a pre-determined period of time).

Therefore, in accordance with the invention, the beverage preparation device can be programmed so that it is given the information to identify in advance which beverage will be the last prepared before shut down and does not have to wait a lengthy run out of a preset timer to shut down the device before initiating a shut down process.

Hence, the automatic power shut down means typically comprises at least one beverage preparation-related shut down mode in which the power management arrangement is programmable by the user to verify during each preparation of a beverage batch whether at least one predetermined shut down condition occurring with the preparation of this beverage preparation batch is fulfilled. The power management arrangement is further programmed to initiate the automatic shut down process of said beverage preparation device if and when this predetermined shut down condition is fulfilled with the preparation of a beverage preparation batch.

As discussed above, the usual prior art energy saving systems merely include a programmable timer that turns off the beverage preparation device after a predetermined period of time, either of non use of the device to prepare beverages, or after switching on the device. Such a prior art device thus leaves the electric components turned on for an extended period of time, until the timer has run out, usually for tens of minutes or even hours, despite the fact that the device is not intended to be used in a near future. In addition to this, in practice it may very well happen that the user will want to have a beverage shortly after the timer has run out and the device has been shut off automatically, so that the device will first have to be again started up despite the fact that no significant energy savings could be achieved.

In contrast, the beverage preparation device of the present invention offers the user the possibility to program the device so that it automatically shuts down after the preparation of a last beverage batch, when the device is foreseeably not going to be used in a close future to produce further beverage batches. In other words, the condition that triggers the automatic shut down of the device does not lie in the extended inactivity of the device after a last preparation of a beverage (or the expiry of a time period set when the device is shut on), which extended period of time represents a simple waste of energy like prior art timer-based shut off systems. On the contrary, the beverage production device according to the invention can be programmed by the user so that an event occurring during a beverage preparation triggers the automatic shut down process when no further beverage will foreseeably be prepared for a while. This event may occur at a time which is not or hardly predictable in advance by the device.

In one embodiment of the invention, a predetermined shut down condition that can be preselected by the user is the preparation of a last beverage batch of a user predetermined maximum number of preparations of beverage batches after said beverage preparation device has been switched on and until said device is again switched on or reprogrammed by the user.

This feature allows the user to program the beverage preparation device so that it shuts down automatically after a certain number of beverage batches, predetermined by a user, has been dispensed from the moment the device has been switched on. Such a feature is particularly advantageous for beverage preparation devices, such as coffee machines, that are used in households or offices where a group of users have day after day a standard, a nearly ritual behaviour regarding their beverage consumption, for instance a tee or coffee consumption at breakfast, during break time or after lunch. Moreover, a user of the group does not need to check whether all members of the group have already had their beverage(s) before turning off the device, as the device itself counts the number of individual beverages that are prepared and shuts down automatically when all members of the group have had their beverage(s), which corresponds to the user programmed number of beverage preparations.

In another embodiment of the invention, a predetermined shut down condition that can be preselected by the user is the occurrence of a need for maintenance or service of the beverage preparation device before a further beverage batch can be prepared. In this case, since an intervention must first be carried out on the beverage dispensing machine before a further beverage can be dispensed, the machine might as well be switched off automatically after the last beverage preparation, at least until a user decides to intervene on the machine for service or maintenance, since in any case no beverage can be dispensed until such service or maintenance is carried out.

For instance, the beverage preparation device is associated with a supply of liquid, typically in a reservoir, in fluid connection with the liquid conditioning means, a predetermined shut down condition that can be preselected by the user being a shortage of the liquid supply. The beverage preparation device may also be associated with a means for storing an ingredient, e.g. tee or coffee, in particular in the form of pre-portioned ingredient batches, other than said liquid. In this latter case, a predetermined shut down condition that can be preselected by the user, is a shortage of said ingredient in the storing means. Furthermore, the beverage preparation device may also be associated with one or more receptacles for collecting used or waste material, such as a used ingredient or waste liquid. In such a situation, a predetermined shut down condition that can be preselected by the user, is a fullness of one of the receptacles.

In all these examples, a user has first to provide for a liquid or other ingredient supply, or empty a collection reservoir before a new beverage batch can be prepared. During this time, the beverage preparation device may be started up without significant further loss of time, which means that the beverage preparation device can advantageously be switched off in such a case to save energy until a user carries out the needed service or maintenance job on the device.

To increase the flexibility of the automatic shut down arrangement, the automatic shut down means may further include at least one timer-based shut down mode in which the power management arrangement is programmable by the user to run the automatic shut down process once a predetermined period of time, in particular a period of time set by the user, has lapsed.

As mentioned above, a timer-based automatic shut down system will not be optimal for certain situations. However, in other cases, for instance when the beverage preparation device is left alone turned on, usually forgotten, a timer system to shut down the device may prove to be useful. This may for example happen in the evening after a work day, when people may tend to be more relaxed and adopt a less repetitive behaviour day after day, including regarding beverage consumption. In such a case, it may be useful to provide for the possibility of programming such a timer-based automatic shut down procedure, so that the device will nevertheless be shut down after a certain period of time of inactivity.

For example, the device may be programmed on the one hand to shut down automatically in the morning, after lunch and at break times after a certain number of cups have been dispensed, and optionally when there is a need for maintenance or service. On the other hand, in the evening, the automatic shut down of the machine may be timer-based.

The automatic shut down means may be programmable in the timer-based shut down mode to run the automatic shut down process when for a period of time no beverage has been prepared, which period of time corresponds to the period of time predetermined by the user. Moreover, the automatic shut down means can be programmable in the timer-based shut down mode to run the automatic shut down process once said beverage preparation device has been switched on for a period of time corresponding to the period of time predetermined by the user.

In this latter timer-based shut down mode, the power management arrangement is preferably configured to verify, once the beverage preparation device has been switched on for a period of time corresponding to the period of time predetermined by the user, whether a batch of beverage is being prepared, and, if so, to delay the running of the automatic shut down process until preparation of said beverage batch is over. Otherwise, the shut down process may enter into conflict with a beverage preparation cycle.

In an advantageous embodiment, the automatic shut down means is programmable in a mixed shut down mode, combining the abovementioned beverage preparation-related shut down mode and the timer-based shut down mode, so as to initiate the shut down process after:
a) the predetermined period of time has lapsed; or
b) a user-preselected shut down condition is fulfilled by the preparation of a last beverage batch before initiation of the shut-down process,
whichever of events a) and b) occurs first.

The combination of the two modes may provide a solution, for the case when the beverage production device is programmed to shut down automatically after a number of beverage preparations but for one reason or another all the users for whom the beverages are intended do not exhaust their beverage quota, so that the beverage preparation device would normally remain switched on until a user takes care of it. In this case, as a subsidiary measure, the beverage preparation device may be automatically shut down based on a timer system.

The power management arrangement may be configured, and optionally programmable by the user, to run the automatic shut down process to a switched off state: in one step; or in a first step from a higher to a lower power consumption state, and then, if after a predetermined period of time said device has not been operated by the user to reverse the automatic shut down, to a switched off state in a second step.

For example, in the two step shut down process, the power management arrangement may in a first step turn off electric beverage preparation components, such as heating and/or cooling elements, and in a second step, immediately after the first step or slightly delayed, carry out a self-cleaning process of the device and then switch off the beverage preparation device completely.

When the device includes a self-cleaning process, attention should be given to the fact that, in case the device is shut down automatically after a predetermined number of beverages have been prepared, the self-cleaning process does not lead to mixing used cleaning liquid, usually water, with the last beverage that has been prepared. To avoid this, the cleaning liquid should be diverted from the device's beverage dispenser nozzle directly into a waste liquid collection reservoir. Alternatively, the user should be given a period of time, for instance a few seconds or a couple of minutes preferably accompanied with a warning signal, to remove his/her beverage from under the dispenser nozzle before the self-cleaning process is started.

The power management arrangement may comprise a user interface for manually turning on and off said device, and can be associated with an interface for programming the automatic shut down option (hereinafter "the automatic shut down interface"). The automatic shut down interface may be a user interface which is integral with said beverage preparation device, or an interface which is linkable to a user interface that is external to said beverage preparation device.

For simple programming of the beverage preparation device, e.g. for programming a maximum number of beverage preparations shut down mode and/or a timer-based shut-down mode, an interface on the device itself would be sufficient. However, when the an automatic shut-down arrangement should be programmed to incorporate several different shut down modes, the use of a remote computer-type input device linked to the beverage preparation device may be a handy alternative. For instance, the device may be programmed for different periods of time in a day or even incorporate different programs for different days in a week, for example on the one hand for week days and on the other hand for weekends.

The automatic shut down interface may comprise a plurality of shut down selectors that are selectable by the user and that correspond to specific programs for at least one beverage preparation-related shut down mode and, optionally and if present, for at least one timer-based shut down mode. The shut down selectors may be adjacent the user interface for manually turning on and off said device. The user interface for manually turning on and off the device and the shut down selectors can be generally aligned, or the shut down selectors can be generally arranged in a loop on the device and optionally located around the user interface for manually turning on and off the beverage preparation device. The shut down selectors and the user interface for manually turning on and off the beverage preparation device may be combined in a turn-and-push button.

Shut down selectors, for selecting a maximum number of beverage preparations before the device is automatically turned off, can have each a sign representing a maximum number of batches (e.g. cups) selectable by the user. Moreover, the automatic shut down interface may be so arranged to indicate during use of the beverage preparation device the remaining number of beverage batches that can be prepared before automatic shut down of the device by designating, in particular by highlighting, the selector representing the corresponding or closest number of remaining batches (or cups) to be prepared before the device is automatically shut down.

The automatic shut down interface and/or the manual power switch interface may comprise switches, push buttons, tactile buttons and/or a touch screen.

Advantageously, the power management arrangement comprises a memory module for storing and saving the user program(s) that configure(s) the power management arrangement, so that a user does not have to reprogram the automatic shut down arrangement every time the beverage preparation device is switched on.

Usually, the power management arrangement will include a microcontroller to control the configuration process and the shut down process.

The power management arrangement may also be programmed so that it does not just shut down the device automatically but also to switch it on automatically, for instance early in the morning. In such a case, the first user in the morning does not first have to wait until the start up procedure of the beverage preparation machine is carried out to be served a beverage but finds a beverage preparation device that is ready to dispense beverages.

The invention also relates to an electrically powered device for preparing beverages, in particular hot beverages, such as beverages prepared on the basis of pre-portioned ingredient batches, in particular contained in packages such as capsules. Such a device comprises: means for conditioning a liquid to prepare one or more batches, in particular cups, of beverage after such a beverage preparation device has been switched on; and a power management arrangement that includes a user-programmable automatic power shut down means for shutting down automatically such a beverage preparation device by running an automatic shut down process after a beverage has been prepared. In accordance with the invention, the automatic power shut down means is programmable to initiate the shut down process in at least one beverage preparation-related shut down mode and/or in at least one timer-based shut down mode, which beverage preparation-related shut down mode(s) and timer-based shut down mode(s) are selectable individually and/or in combination by the user.

An advantage of such a beverage preparation device is the great flexibility that is given to the user for programming the automatic power shut down arrangement to meet his/her needs as close as possible.

This beverage preparation device may be combined with any of the above discussed features or combination of features.

A further aspect of the invention relates to an electrically powered device for preparing beverages, in particular hot beverages, such as beverages prepared on the basis of pre-portioned ingredient batches, in particular contained in packages such as capsules. The device comprises: means for conditioning a liquid to prepare one or more batches, in particular cups, of beverage after such beverage preparation device has been switched on; and a power management arrangement that includes an automatic power shut down means, in particular a user-programmable automatic power shut down means, for shutting down such beverage preparation device automatically by running an automatic shut down process once this beverage preparation device has been switched on for a period of time corresponding to a predetermined period of time, in particular a user-predetermined period of time. In accordance with the invention, the automatic shut down means is configured to verify, once said beverage preparation device has been switched on for a period of time corresponding to the predetermined period of time, whether a batch of beverage is being prepared, and, if so, to delay the running of the automatic shut down process until the beverage preparation is over.

An advantage of such a beverage preparation device is that, even though the time period for which it is intended to be switched on is predetermined, the power management arrangement will not shut down the device prematurely during the preparation of a beverage batch. Thus, if a beverage is in the process of being prepared at the time when the device is supposed to be turned down, the preparation of the beverage will nevertheless proceed until normal completion of the beverage preparation cycle and not be aborted in the middle of it. The shut down process will be slightly postponed and will be carried out only after this beverage preparation cycle is over.

This beverage preparation device may be combined with any of the above discussed features or combination of features.

A yet further aspect of the invention concerns a user-programmable power management arrangement connectable to an electrically powered device, in particular a beverage preparation device as disclosed above. The arrangement includes a user-programmable automatic power shut down means for shutting down automatically an electrically powered device connected thereto. In accordance with the invention the automatic power shut down means is programmable to initiate the shut down process in at least one beverage preparation-related shut down mode.

Likewise, this user-programmable power management arrangement may be combined with any of the features or combination of features relating to the user-programmable power management arrangement of the above discussed beverage preparation device.

The power management arrangement may further comprise at least one timer-based shut down mode, the beverage preparation-related shut down mode(s) and timer-based mode(s) being selectable individually and/or in combination by the user.

In particular when the user-programmable power management arrangement is external to the beverage preparation device and operates in a beverage preparation-related shut down mode, the power management arrangement can be arranged to monitor fluctuations of electric power consumed by an electrically powered device connected thereto and programmed to shut down automatically said electrically powered device when a predetermined condition relating to the power consumption is fulfilled. For instance, the power consumption of a beverage preparation device is normally higher when the device is in the process of dispensing a beverage. By monitoring the power consumption, the number of beverages that are dispensed can be counted by the power management arrangement, for example as a basis for switching off the power supply to the beverage preparation device. Likewise, the user-programmable power management arrangement may include a sound detecting means, in particular including a microphone, to monitor the noise made by the beverage preparation device during use and which depends on its operative state: in the process of preparing a beverage, beverage preparation device usually uses a pump that makes a recognisable noise during the process and that can serve as a basis for monitoring the number of beverages that are prepared.

As indicated above, the power management arrangement may be configured, e.g. as a self standing device, to be external to an electrically powered device to which it is connected and may be connected between this electrically powered device and an electric supply network (e.g. the mains).

Another aspect of the invention relates to a power management arrangement connectable to an electrically powered device for performing a specific function and which has a power consumption that varies depending the performance of its function, in particular a device whose function is to prepare beverage batches described above. This arrangement includes an automatic power shut down means, in particular a user-programmable automatic power shut down means, for shutting down such device automatically by running an automatic shut down process. In accordance with the invention, the automatic shut down means is arranged to monitor during use variations of electric power consumed by the electrically powered device connected thereto and verify whether a predetermined condition relating to the performance of the device's function is fulfilled to allow the automatic shut down process to run, the condition being derivable from variations of electric power consumed by the device.

Typically, when the device is not merely switched on but actually used to perform the function for which it has been designed, e.g. actually prepare a beverage, the electric power consumption increases while the function is performed. This power consumption increase will be monitored by the power management device with the view of initiating the shut down process, e.g. after the device has been used a predetermined number of times to perform the function or after the device has been switched on for a predetermined period of time and is not in use to carry out its designed function or after the device has not been used for a predetermined period of time to perform its dedicated function. It is however also contemplated that for some devices the power consumption will decrease by the performance of the function for which they are designed.

In a timer-based mode, the automatic shut down means is further configured or configurable to run the automatic shut down process after the electrically powered device has been switched on for a period of time corresponding to a predetermined period of time, in particular a user-predetermined period of time, the predetermined condition allowing automatic shut down being that the device is not in the process of performing its function. In other words, once the predetermined period of time after switching on has run out, the device is shut down if it is not in the process of performing its designed function, or, in the alternative, the shut down process is postponed until performance of the function is completed by the device. In the latter case, the shut down process may be initiate immediately after the function is completed or slightly delayed, e.g. for a few tens of seconds or a couple of minutes.

In another timer-based mode, the predetermined condition is that the device has not performed its function for a period of time corresponding to a predetermined period of time, in particular a user-predetermined period of time.

Another predetermined condition may be that the device has been used a predetermined number of times to perform its function, in particular a user-predetermined number of times.

Normally, the automatic shut down means is arranged to run the automatic shut down process immediately after the predetermined condition is fulfilled or with a delay, usually short, after the predetermined condition is fulfilled. Such a delay may typically be of the order of a few seconds, a few tens of seconds or up to a couple of minutes.

The power arrangement may comprise a user interface for programming the arrangement or control thereof, or may be remotely programmed and controlled.

BRIEF DESCRIPTION OF THE DRAWINGS

The invention will now be described with reference to the schematic drawings, wherein.

DETAILED DESCRIPTION

Figure 1:
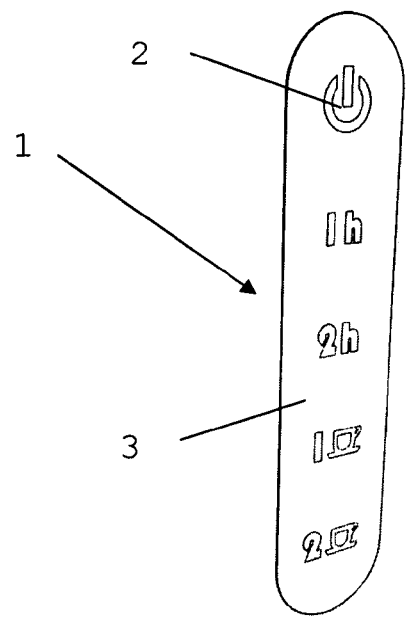
FIGS. 1 and 2 show different user interfaces for a beverage preparation device according to the invention.

FIG. 1 shows a user interface 1 of a beverage preparation device according to the invention, such as an espresso machine used to dispense coffee from pre-proportioned ground coffee batches, for instance supplied within packages, typically capsules, into machine for extraction by passing heated water therethrough, as known in the art. The beverage preparation device has a user-programmable power management arrangement that includes a user-programmable automatic power shut down means for shutting down automatically this beverage preparation device by running an automatic shut down process.

The automatic power shut down means comprises a controller with a beverage preparation-related shut down mode in which a user may program the power management arrangement: to verify during each preparation of a beverage batch whether the shut down condition is fulfilled that this preparation corresponds to the last beverage preparation batch of a user predetermined maximum number of preparations of beverage batches after the beverage preparation device has been switched on (or reset); and, if this condition is fulfilled, to initiate the automatic shut down process of the beverage preparation device. The automatic power shut down means also comprises a timer-based shut down mode in which the power management arrangement is programmable by the user to run the automatic shut down process once a predetermined period of time has lapsed without beverage preparation, i.e. in the present example, one or two hours.

The user-programmable power management arrangement of this beverage preparation device thus allows the user which decides to enable the automatic shut down mode, to program an automatic shut down mode based on the number of beverage preparations that are to be carried out, on a timer-based system and on a combination of both.

As shown in FIG. 1, interface 1 comprises an upper user interface 2 for manually turning on and off said device and a lower automatic shut down user interface 3. The upper interface 1 has one press button that is adjacent to and vertically aligned with four press buttons of the lower interface 3.

The automatic shut down user interface 3 has two upper buttons that provide the user with a choice of periods of times for the timer-based shut down mode, i.e. 1 hour and 2 hours, indicated by the signs "1 h" and "2 h" on the buttons themselves.

Hence, if the user wishes that the beverage preparation device shuts down in any case when it has not been in use for an hour to prepare beverages, he/she will push the button with the sign "1 h" that will set the user-programmable power management arrangement accordingly, and preferably highlight the button to indicate that the one hour timer option has been selected. However, if he/she wishes to disable the timer option, he/she will simply press the same button again.

The automatic shut down user interface 3 further has two lower buttons, with a choice of number of beverage cups that can be dispensed before the beverage preparation device is automatically shut down, that are marked with a figure "1" or "2" together with a cup symbol representing the number of cups that can be selected.

Likewise, if the user wishes that the beverage preparation device shuts down after having dispensed two cups, he/she will push the button with the corresponding sign representing two cups. This will set the user-programmable power management arrangement accordingly, and preferably highlight the button to indicate that the two-cup option has been selected. However, if he/she wishes later to disable this option, he/she will simply press the same button again.

Moreover, if the user wishes that the beverage preparation device shuts down after having served two cups but in any case after two hours without beverage preparation, he/she will press (and activate) the button with the sign "2 h" as well as the button with the sign representing the two cups.

In this case, when a first beverage cup is prepared, the button with the two cups will be switched off and the button with only one cup will be highlighted, indicating that only one further cup will be served before automatic shut down. Likewise, if the beverage machine is not used to prepare a beverage for over one hour, the button with the sign "2 h" will be switched off and the button with the sign "1 h" will be highlighted, indicating that the beverage preparation device will not remain switched on for more than one hour if no beverage is dispensed in the meantime.

Hence, this user interface provides a simple solution for an intuitive multi-mode programming of a user-programmable power management arrangement, giving confirmation feed back to the user not only at the time of programming the power management arrangement but also indication thereafter as to the changing status of the beverage preparation machine with reference to its automatic shut down, so that the user may at any time find out whether the automatic shut down setting suits him/her or whether it needs to be reprogrammed.

For the purpose of simplification, only two timer options (one or two hours) and two options relating to the number of cups (one or two cups) are shown in FIG. 1. It is evident that a greater number of options can be provided, for example up to 5 or 10 buttons for a corresponding number of cups and up to 5 or 10 for the timer options (for example a progression of available timer periods at a rate of 30 minutes starting from 30 minutes).

Figure 2:
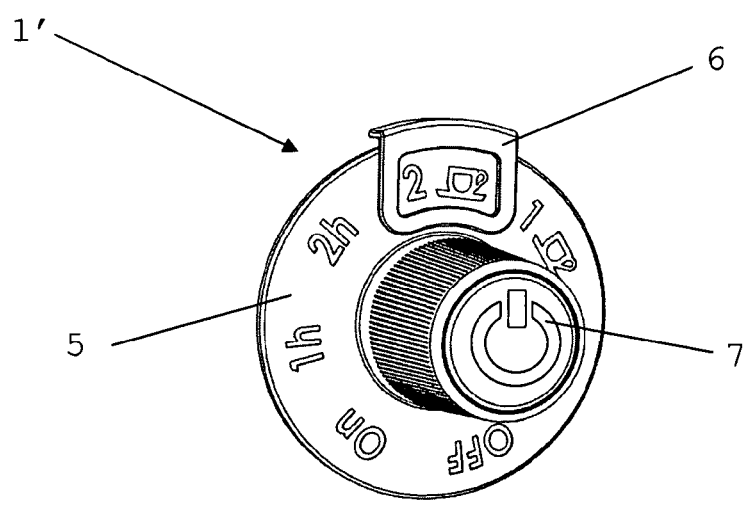

FIG. 2 shows another user interface 1' of a beverage preparation device according to the invention for programming and controlling the device's power management arrangement (not shown).

The automatic power shut down means comprises a beverage preparation-related shut down mode (relating to the preparation of one or two cups before automatic shut down) and a timer-based shut down mode, i.e. automatic shut down after one or two hours of non use of the beverage preparation device to prepare beverages.

User interface 1' comprises a turn-and-push button 7 having a peripheral part 5 with different selectors for programming the automatic power shut down means, i.e. two selectors for different durations of the timer mode, one hour "1 h" and two hours "2 h", and two different cup numbers, one or two cups indicated by the corresponding numbers and symbols on the peripheral selectors. Interface 1' further comprises an indicator 6' in the shape of a frame that indicates which one of the peripheral selectors is selected upon rotation of turn-and-push button 7. Also shown on peripheral part 5 are selectors for switching on and off the beverage preparation device, the selectors being designated by the words "on" and "off".

After having turned turn-and-push button 7 so that the indicator 6 designates the desired peripheral selector, button 7 is pressed so as to activate the selection. The deprogramming or reprogramming of the automatic power shut down means can be achieved by repeating the same procedure, either to select a different shut down condition (by choosing a different one of the same mode) or to cancel a shut down condition (by reselecting it and disabling it by pushing button 7). As discussed previously, the timer shut down mode and the beverage preparation-related shut down mode (in the present case, the mode relating to the number of cups to be prepared before shut down) can be enabled together or individually or both disabled by the user to provide a maximum flexibility.

Likewise, the accepted selectors can be highlighted for providing feedback to the user as to their activation/deactivation status. Furthermore, the same or a different highlighting of the selectors may be provided to indicate as to the changing status of the beverage preparation machine during use with reference to a programmed automatic shut down process, as discussed above.

What is claimed is:

1. An electrically powered device for preparing beverages on the basis of pre-portioned ingredient batches or packages, the device comprising:
    a beverage preparation component that prepares a beverage;
    a liquid conditioning member to prepare one or more batches or cups of beverage after such beverage preparation device has been switched on, the liquid conditioning member providing conditioned liquid to the pre-portioned ingredient batches or packages in the beverage preparation component to form the beverage; and
    a power management arrangement that includes a user-programmable automatic power shut down member for shutting down such beverage preparation device automatically by running an automatic shut down process which shuts off all-electrical power to the beverage preparation component of the device after a beverage has been prepared,
    wherein the automatic power shut down member is programmable to activate (1) a first mode of the automatic shut down process in which the user selects a number of beverage preparations after which the activated shut down mode initiates the shut down process, (2) a second mode of the automatic shut down process in which the user selects a time period after which the activated shut down mode initiates the shut down process, and (3) a third mode of the automatic shut down process in which the user selects a number of beverage preparations after which the activated shut down mode initiates the shut down process, and selects a time period after which the activated shut down mode initiates the shut down process if the selected number of beverage preparations has not been performed by the end of the time period.

2. An electrically powered device for preparing beverages on the basis of pre-portioned ingredient batches or packages, the device comprising:
    a beverage preparation component that prepares a beverage;
    a liquid conditioning member to prepare one or more batches or cups of beverage after such beverage preparation device has been switched on to provide electrical power to the device, the liquid conditioning member providing conditioned liquid to the pre-portioned ingredient batches or packages in the beverage preparation component to form the beverage; and
    a power management arrangement that includes an automatic power shut down member for shutting down such beverage preparation device automatically in one of a number of different modes by running an automatic shut down process which shuts off electrical power to the beverage preparation component of the device once the beverage preparation device has been switched on for a period of time corresponding to a predetermined period of time,
    wherein, before shutting down the device, the automatic shut down member verifies whether a batch of beverage is being prepared, and upon determining that a batch of beverage is being prepared, delays the running of the automatic shut down process until the beverage preparation is over, and
    wherein the automatic power shut down member is programmable to activate (1) a first mode of the shut down process in which the user selects a number of beverage preparations after which the activated shut down mode initiates the shut down process, (2) a second mode of the automatic shut down process in which the user selects a time period after which the activated shut down mode initiates the shut down process, and (3) a third mode of the shut down process in which the user selects a number of beverage preparations after which the activated shut down mode initiates the shut down process, and selects a time period after which the activated shut down mode initiates the shut down process if the selected number of beverage preparations has not been performed by the end of the time period.

3. The device of claim 2, wherein the automatic power shut down member is programmable by the user to initiate the shut down process upon completion of the preparation of a last beverage batch if a user-preselected shut down condition has been fulfilled by the preparation of the last beverage batch.

4. The device of claim 3, wherein the liquid conditioning member includes electronic components for heating or cooling the liquid, and wherein at least one user-preselectable shut down condition is not fulfilled by every preparation of a beverage batch.

5. The device of claim 3, wherein at least one user-preselectable shut down condition is the preparation of a last beverage batch of a user predetermined maximum number of preparations of beverage batches after the beverage preparation device has been switched on and until the device is again switched on or reprogrammed by the user.

6. The device of claim 3, wherein at least one user-preselectable shut down condition is an occurrence of a need for maintenance or service of the beverage preparation device before a further beverage batch can be prepared.

7. The device of claim 6, in association with a supply of liquid in fluid connection with the liquid conditioning member, wherein at least one user-preselectable shut down condition is a shortage of the liquid supply.

8. The device of claim 6, which is associated with storing member for storing a beverage forming ingredient other than the liquid in the form of preportioned ingredient batches, wherein at least one user-preselectable shut down condition is a shortage of the beverage forming ingredient in the storing member.

9. The device of claim 6, wherein which is associated with one or more receptacles for collecting used or waste beverage forming ingredients, packages or capsules previously containing such ingredients, or waste liquid, and wherein at least one user-preselectable shut down condition is a fullness of one of the one or more receptacles.

10. The device of claim 1, wherein the automatic shut down member is user-programmable in a timer-based shut down mode to run the automatic shut down process once a predetermined period of time has lapsed, with the time period predetermined and preselected by the user.

11. The device of claim 10, wherein the automatic shut down member is programmable in the timer-based shut down mode to run the automatic shut down process when for a period of time no beverage has been prepared, which period of time corresponds to the time period predetermined by the user.

12. The device of claim 10, wherein the automatic shut down member is programmable in the timer-based shut down mode to run the automatic shut down process once the beverage preparation device has been switched on for a period of time corresponding to the time period predetermined by the user.

13. The device of claim 12, wherein the automatic shut down member is configured in the timer-based shut down mode to verify, once the beverage preparation device has been switched on for a period of time corresponding to the period of time predetermined by the user, whether a batch of beverage is being prepared, and, upon determining that a batch of beverage is being prepared, to delay the running of the automatic shut down process until preparation of the beverage batch is over.

14. The device of claim 10, wherein the automatic shut down member is programmable in a mixed shut down mode so as to initiate the shut down process after:
the predetermined period of time has lapsed; or
a user-preselected shut down condition is fulfilled by the preparation of a last beverage batch before initiation of the shut down process, or
whichever of events a) and b) occurs first.

15. The device of claim 1, wherein the power management arrangement is configured, and optionally programmable by the user, to run the automatic shut down process to a switched off state:
in one step; or
in a first step from a higher to a lower power consumption state, and then, if after a predetermined period of time said device has not been operated by the user to reverse the automatic shut down, to a switched off state in a second step.

16. The device of claim 1, wherein the power management arrangement comprises a first user interface for manually turning on and off the device, and is associated with a second user interface for programming the automatic shut down member.

17. The device of claim 16, wherein the second user interface is integral with the beverage preparation device or is linkable to a separate user interface that is external to the beverage preparation device.

18. The device of claim 16, wherein the second user interface comprises a plurality of shut down selectors that are selectable by the user and that correspond to specific programs and, optionally, when at least one timer-based shut down mode is present, the device includes shut down selectors located adjacent the user interface for manually turning on and off the device.

19. The device of claim 18, wherein the shut down selectors and the user interface for manually turning on and off the device are combined in a turn-and-push button.

20. The device of claim 19, wherein comprising shut down selectors that each have a sign representing a maximum number of batches selectable by the user, and wherein the automatic shut down interface is arranged to indicate during use of the beverage preparation device the remaining number of beverage batches that can be prepared before automatic shut down of the device by designating or highlighting the selector representing the corresponding or closest number.

21. The device of claim 2, wherein the timer-based shut off mode is configured to be external to the device to which it is connected and to be connected to an electric supply network.

22. The device of claim 2, arranged to monitor fluctuations of electric power consumed therein, wherein the power shut down member is programmable to automatically shut down when a predetermined condition relating to the power consumption is fulfilled.

23. The device of claim 1 having a power consumption that varies depending the performance of its function, wherein the automatic shut down member is arranged to monitor during use variations of electric power consumed by the device and to verify whether a predetermined condition relating to the performance of the function of the device is fulfilled to allow the automatic shut down process to run, with the predetermined condition being derivable from variations of consumed electric power.

24. The device of claim 23, wherein the automatic shut down member is further configured or configurable to run the automatic shut down process after the electrically powered device has been switched on for a period of time corresponding to a predetermined period of time optionally determined by the user, with the predetermined condition allowing automatic shut down when the device is no longer performing its function.

25. The device of claim 2, wherein the automatic shut down member verifies whether the device has not performed its function for a period of time corresponding to a predetermined period of time which is optionally determined by the user.

26. The device of claim 1, wherein the automatic shut down member verifies whether the device has been used a predetermined number of times to perform its function before shutting off the electrical power.

27. The device of claim 23, wherein the automatic shut down member is arranged to run the automatic shut down process immediately after the predetermined condition is fulfilled or with a delay after the predetermined condition is fulfilled.

* * * * *